United States Patent [19]
Perego

[11] Patent Number: 5,924,506
[45] Date of Patent: Jul. 20, 1999

[54] MOTORIZED WHEEL ASSEMBLY AND TOY VEHICLE WITH SUCH WHEEL ASSEMBLY

[75] Inventor: Gianluca Perego, Arcore, Italy

[73] Assignee: Peg Perego Pines S.p.A., Arcore, Italy

[21] Appl. No.: 08/786,092

[22] Filed: Jan. 17, 1997

[30] Foreign Application Priority Data

Jan. 23, 1996 [IT] Italy ................................ MI96U0051
Jan. 23, 1996 [IT] Italy ................................ MI96U0050

[51] Int. Cl.$^6$ ............................. B60K 1/00; B60K 17/30; B62D 11/04
[52] U.S. Cl. .......................... 180/65.5; 180/252; 180/6.6
[58] Field of Search ................................. 180/65.5, 65.1, 180/65.3, 907, 252, 6.5, 6.6; 301/6.6

[56] References Cited

U.S. PATENT DOCUMENTS

| | | | |
|---|---|---|---|
| 2,122,924 | 7/1938 | Ammen et al. | 280/95 |
| 2,581,554 | 1/1952 | Radford | 301/6.6 |
| 3,004,795 | 10/1961 | Atkin | 301/6.6 |
| 4,483,405 | 11/1984 | Noda et al. | 180/6.5 |
| 4,699,433 | 10/1987 | Kopp | 301/6.6 |
| 4,805,712 | 2/1989 | Singleton | 180/907 |
| 5,224,563 | 7/1993 | Iizuka et al. | 180/65.3 |
| 5,311,957 | 5/1994 | McLaurin et al. | 180/253 |
| 5,482,125 | 1/1996 | Pagett | 180/6.32 |

FOREIGN PATENT DOCUMENTS

| | | | |
|---|---|---|---|
| 2132954 | 7/1984 | United Kingdom | 180/907 |
| 2188889 | 10/1987 | United Kingdom | 180/907 |

*Primary Examiner*—Lanna Mai
*Assistant Examiner*—Bridget Avery
*Attorney, Agent, or Firm*—McGlew and Tuttle, P.C.

[57] ABSTRACT

A wheel assembly (42) for toy vehicles comprises a wheel (13) rotatably mounted on a pivot (25) having a support (49) for supporting it on a vehicle chassis and an electric power unit (44) connected to the wheel to set it in rotation. The power unit (44) is mounted stationary on the pivot and ends towards the wheel with a motor-driven cup-shaped element (46) which rotates coaxially to the pivot (25) and which is received in a corresponding housing (43) provided on the internal face of the wheel and blocked to prevent it from rotating within it.

17 Claims, 5 Drawing Sheets

MOTORIZED WHEEL ASSEMBLY AND TOY VEHICLE WITH SUCH WHEEL ASSEMBLY

BACKGROUND OF THE INVENTION

This invention refers to a motorized wheel assembly suitable for use in a toy vehicle, for example an electric toy car, in which the child can sit. Moreover, the invention refers to a toy vehicle with such wheel assembly.

The general scope of this invention is to provide a motorized wheel which is simple in structure and to assemble and limited in cost, suitable for use in the field of toy vehicles. Such wheel is suitable for producing a toy four-wheel drive, and/or four-wheel steering, vehicle with limited cost and complexity.

SUMMARY OF THE INVENTION

This scope is achieved according to the invention by providing a wheel assembly for toy vehicles, comprising a wheel rotatably mounted on a pivot having means for supporting it on a vehicle chassis and an electric power unit connected to the wheel to set it in rotation, characterized by the fact that the power unit is mounted stationary on the pivot and ends towards the wheel with a motor driven cup-shaped element which rotates coaxially to the pivot and which is received in a corresponding housing provided on the internal face of the wheel and blocked to prevent it from rotating within it.

This scope is further achieved by providing a children's vehicle comprising a chassis, four wheels and a kinematic steering mechanism, characterized by the fact that the driving wheels are achieved with a wheel assembly of the aforesaid type.

BRIEF DESCRIPTION OF THE DRAWINGS

The innovative principles of this invention and its advantages with respect to the known technique will be more clearly evident from the following description of a possible exemplificative and non-restrictive embodiment applying such principles, with reference to the accompanying drawings, in which.

DETAILED DESCRIPTION OF THE INVENTION

Figure 1:
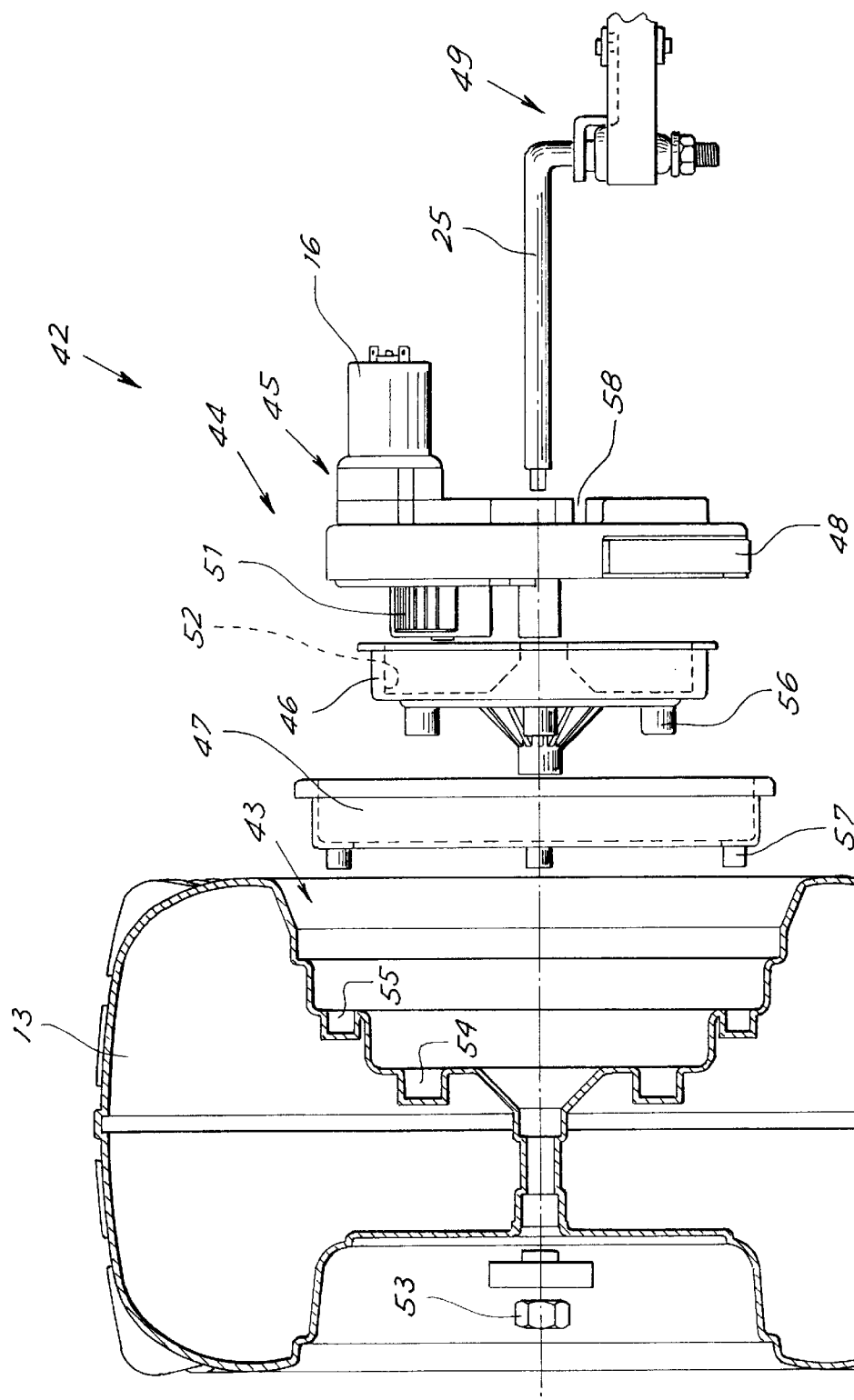
FIG. 1 shows an exploded partial cutaway view of a motorized wheel made according to the invention.

With reference to the figures, FIG. 1 shows a wheel assembly 42 which comprises a wheel 13 (for example in moulded plastic) the internal face of which is provided with a housing 43 for receiving a power unit 44, composed of a portion 45, stationary with respect to the chassis of the vehicle, and a rotating portion or cup 46 integral with the wheel.

Advantageously, the wheel assembly also comprises a drum brake composed of a drum 47 received in the housing 43 and a brake shoe 48 received in the stationary portion 45.

The stationary portion 45 comprises an electric motor 16 which rotates a drive spindle 100 with an output pinion gear 51 protruding so as to be received and fit into a crown wheel 52 provided inside the rotating portion 46.

Figure 2:
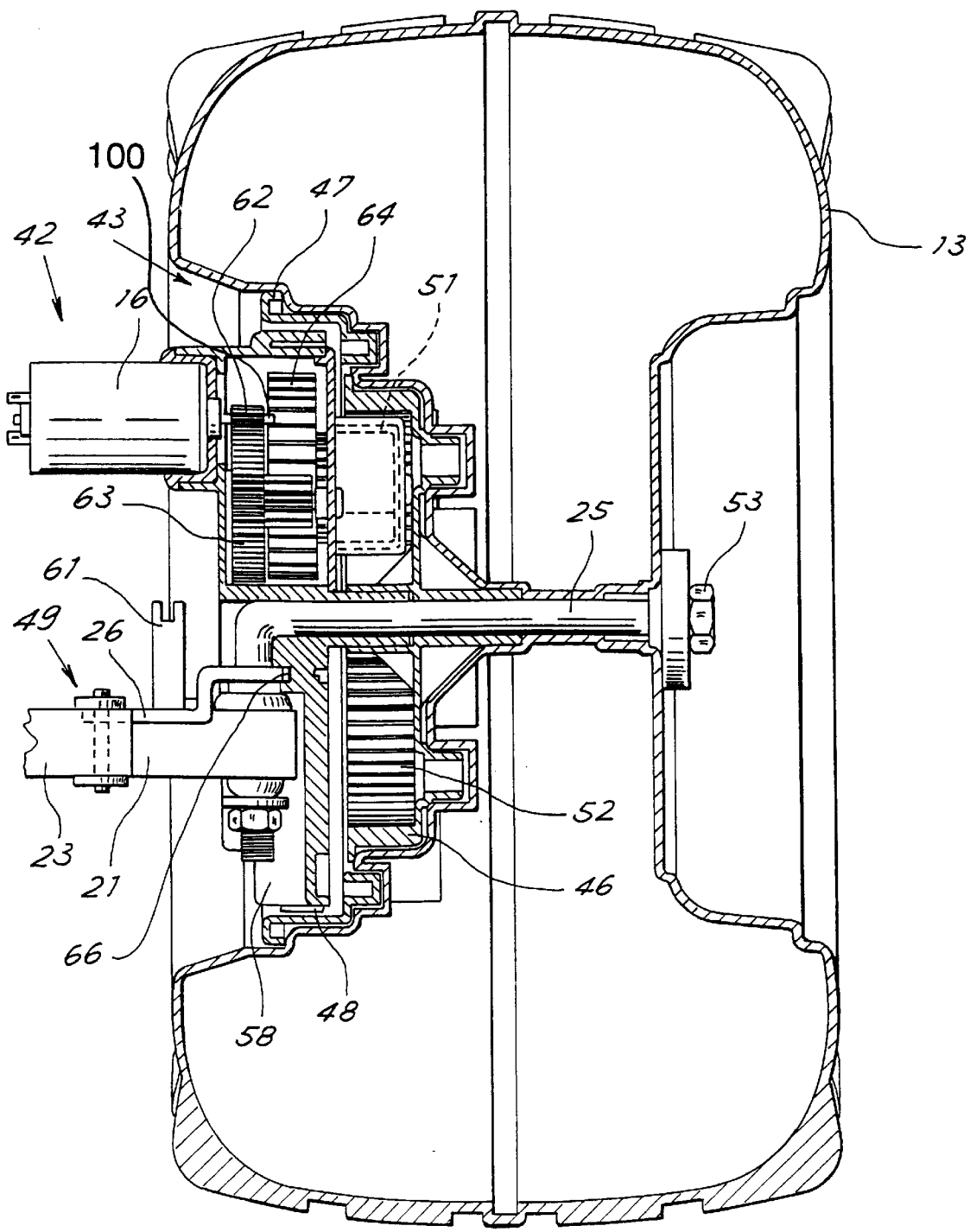
FIG. 2 shows a partial cutaway view of the wheel of FIG. 1 in the assembled condition.

As can also be clearly seen in FIG. 2, the wheel 13, stationary portion 45, rotating portion 46 and drum 47 are disposed coaxially on a pivot 25 for rotation of the wheel. The pivot 25 is in turn supported by a support 49 integral with the vehicle. As will be explained further on, for example the support 49 can comprise a kinematic steering mechanism for steering the wheel.

Advantageously, the wheel 13, stationary portion 45, rotating portion 46 and drum 47 are packed on the pivot 25 by tightening a check nut 53 screwed onto the free end of the pivot 25 to push the elements on the pivot towards a stop element on the other end of the pivot. To prevent relative rotation of the drum 47 and the rotating portion 46 with respect to the wheel 13, the housing 43 comprises recesses 54, 55 which receive, with interference, projections 56, 57 protruding respectively from the rotating portion 46 and from, the drum 47. Conversely, to prevent rotation of the stationary portion 45, the stationary portion 45 is advantageously provided with a housing 58 which, as will be explained in greater detail further on, partially receives the support 49.

Figure 4:
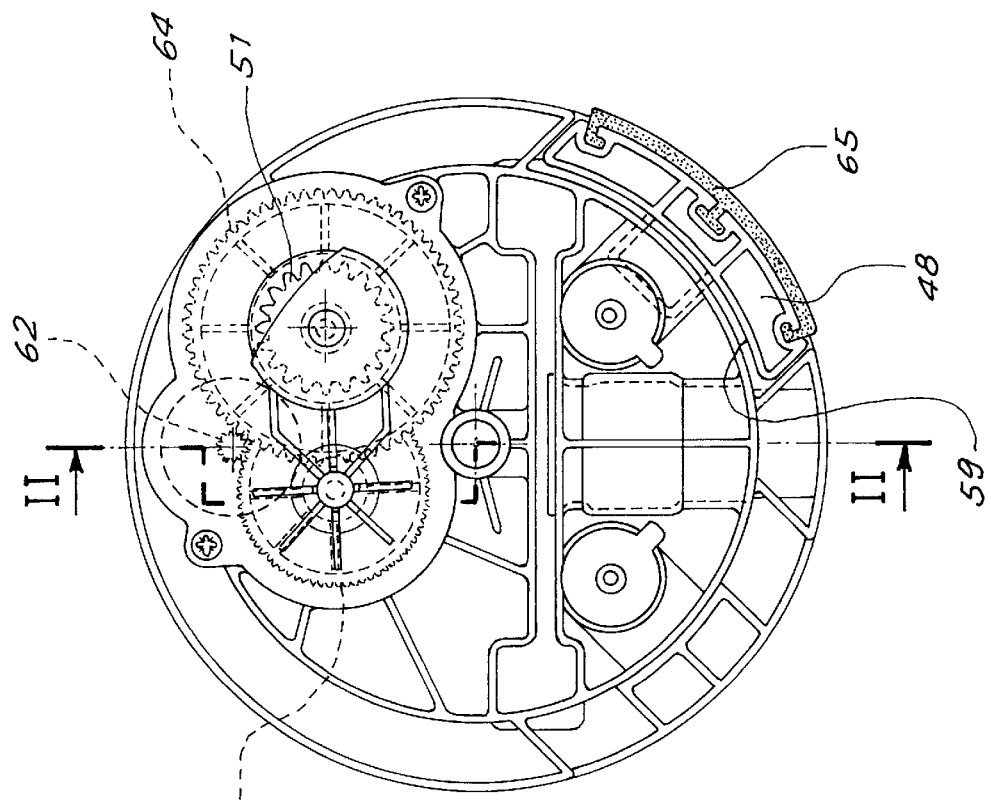
FIGS. 3 and 4 show views taken from opposing faces of a part of the wheel of FIG. 1.
Figure 3:
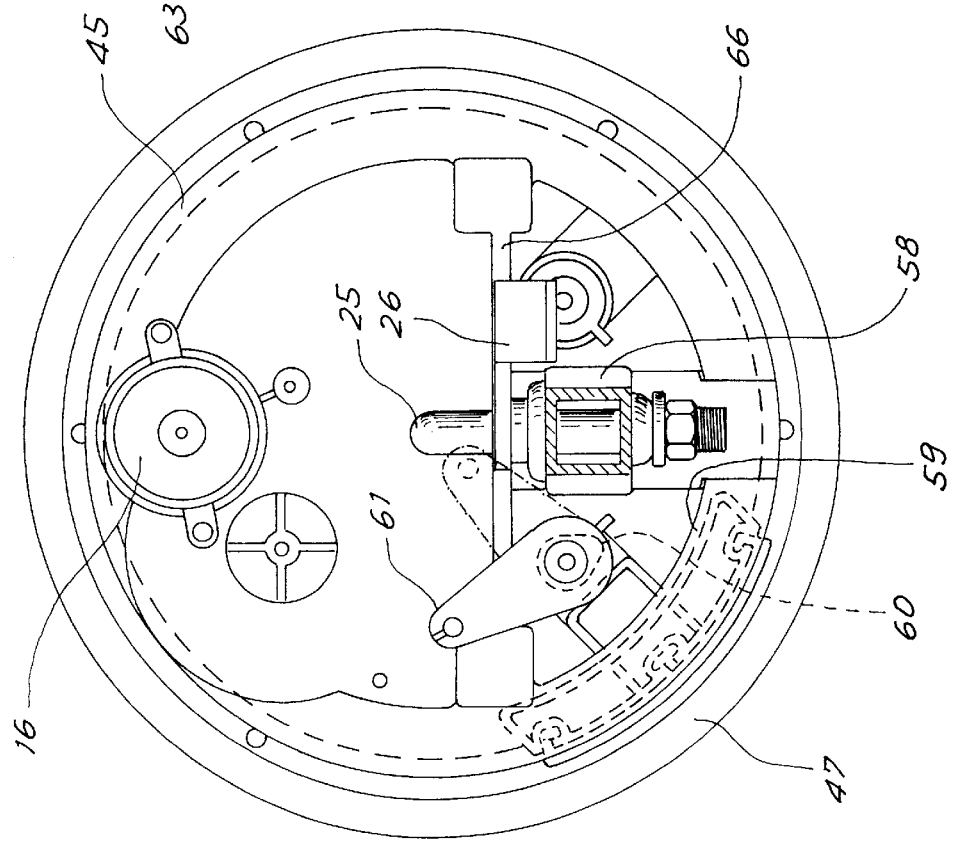

As can be clearly seen in FIGS. 3 and 4, the stationary portion has a radial housing 59 in which slides the brake shoe under the thrust of a cam 60 operated by a lever 61. The lever 61 can be rotated, against the action of a spring (not shown), between the inactive position shown by the continuous line in FIG. 3 and the braked position shown by the "chain" in the same figure. The lever is operated by a tie rod connected to its free end. Such tie rod (not shown) will advantageously be a sheathed flexible cable, operated by a lever or by a brake pedal of the vehicle on which the wheel is mounted.

Upon rotation of the lever, the brake shoe shifts radially to come into contact with the internal peripheral edge of the drum and brake the wheel. For this purpose, the brake shoe is lined with friction material 65.

As can be clearly seen by comparison between FIGS. 2 and 4 (the stationary portion of the motor 45 being generically cutaway in FIG. 2 along the line II—II of FIG. 4), the pinion 51 is operated by the motor 16 through a reduction unit contained in the stationary portion and composed of a pinion 62 integral with the driving shaft, an intermediate gear 63 and a gear 64 integral with the output pinion 51.

A wheel assembly as described can be advantageously used to produce a driving, as well as a steering, wheel. In particular, a four-wheel steering vehicle is consequently easy to produce with limited costs, limited complexity and a high degree of sturdiness.

Figure 5:
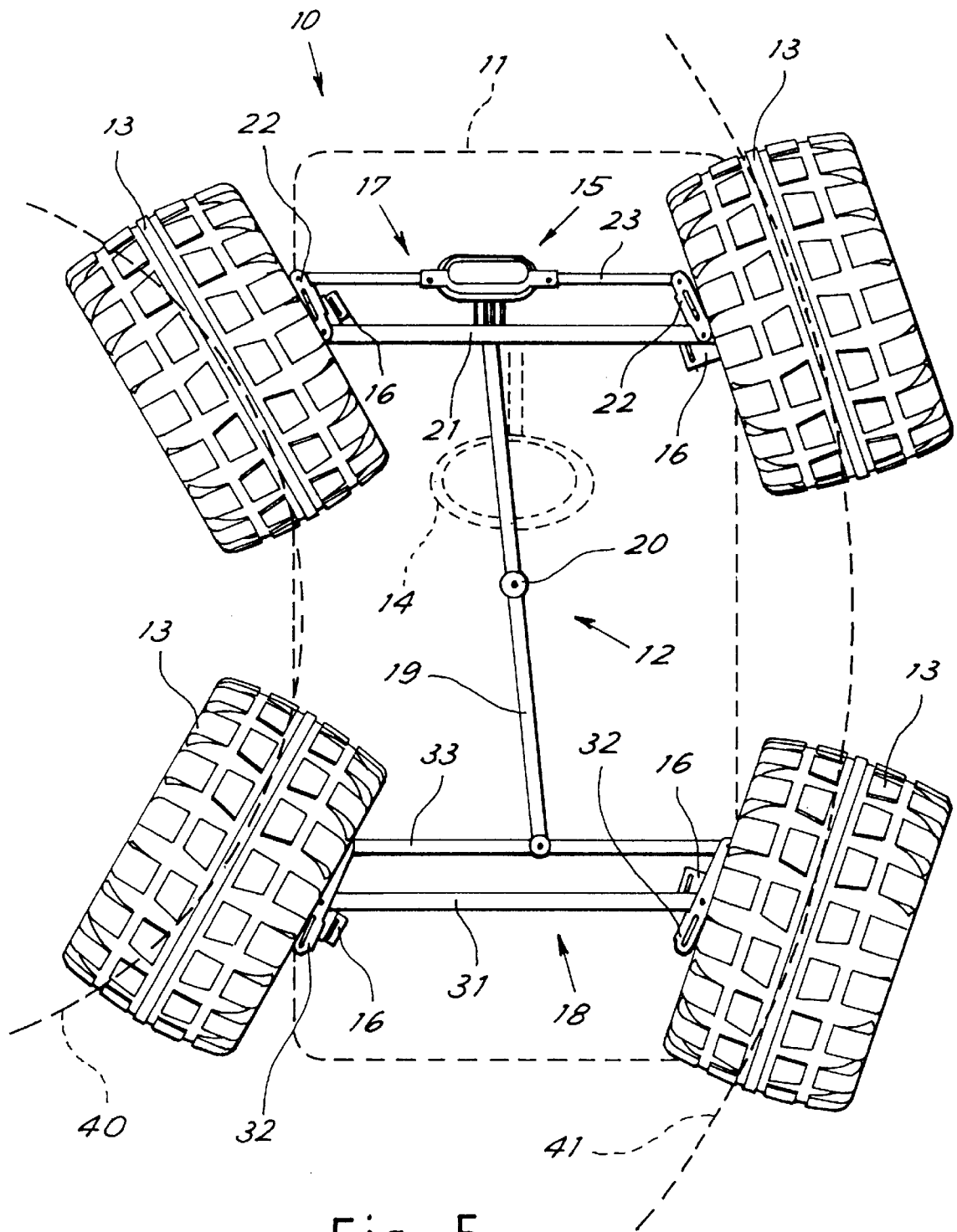
FIG. 5 shows a schematic plan view of a toy vehicle, using the wheels of FIG. 1.

FIG. 5 shows a schematized view of a similar vehicle, for example a toy "off-road" vehicle.

Figure 6:
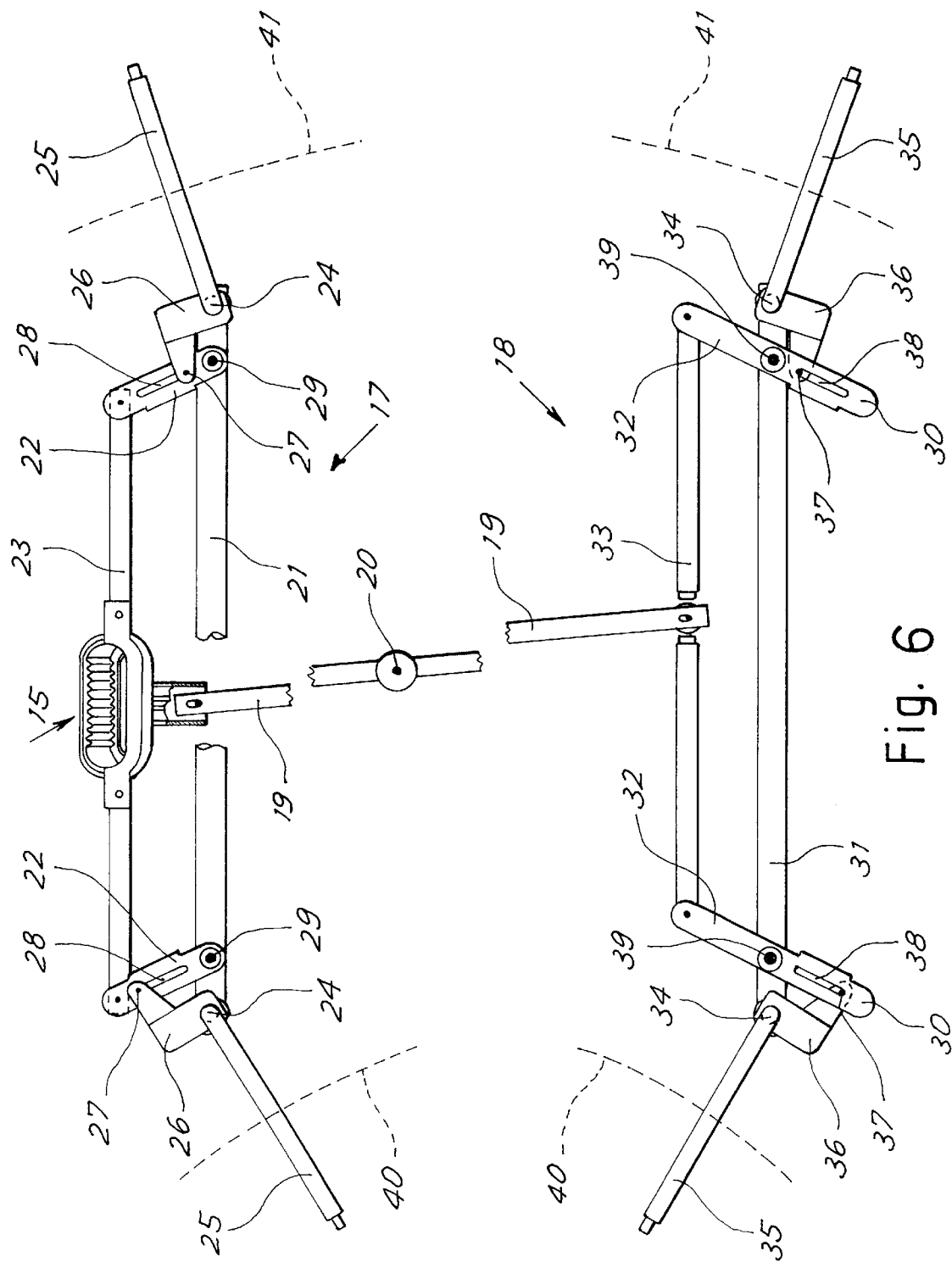
FIG. 6 shows a schematic view of a kinematic steering mechanism of the vehicle of FIG. 5.

The toy vehicle, generically indicated by reference 10, comprises a body or chassis 11 (schematized by the broken line, since it can be of any type whatsoever), which supports a kinematic steering mechanism 12, as can be more clearly seen in FIG. 6, the kinematic steering mechanism is composed of a front articulated quadrilateral 17 and a rear quadrilateral 18 connected by a transmission rod 19, pivoted on 20. The vehicle has a steering wheel 14 connected to the kinematic mechanism 12 by means of a rack 15 to simultaneously control the steering of the four wheels 13.

The body of the vehicle can obviously be of any kind whatsoever, as can the various accessories and elements of the vehicle (seats, battery compartment, starting and stopping controls, etc.). Since all this is easily imaginable by the expert in the field, it will not be described in greater detail herein.

The front and rear quadrilaterals comprise bearing rods 21, 31 integral with the vehicle, and control rods 23, 33 articulated to the bearing rods by means of arms 22, 32. Disposed at each end of the bearing rod 21 (the end disposed on the outside of the pivoting point 29 of the articulating arm), and pivoted according to a vertical axis 24, is a pivot 25 onto which a front wheel 13 is fitted. The pivot 25 is integral with one end of a bell crank lever 26 having its opposite end constrained, by means of a pin 27, to slide within a slot 28 provided in the corresponding arm 28, parallel to its extension, to form a link.

Disposed half way along the connecting rod 23 is the rack 15 which fits onto the axle of the steering wheel (with a suitable articulation), according to a known and not further described arrangement. Upon rotation of the steering wheel, the connecting rod consequently slides either to the right or to the left, deforming the parallelogram formed by the arms 22, so that the bell crank levers 26 are pulled along by their sliding couplings in the arms 22 and rotate the pivots 25 around the axes 24. In the full steering lock position, the pin 27 of the external lever reaches the end of the slot 28 closest to the bearing rod 21, while the pin 27 of the internal lever reaches the end of the slot 28 furthest from the bearing rod 21.

The rear steering assembly or mechanism 18 also comprises an articulated quadrilateral, composed of a bearing rod 31 integral with the chassis of the vehicle, two articulating arms 32 and a connecting rod 33. Disposed at each end of the bearing rod 30, pivoted according to a vertical axis 34, is a pivot 35 on which a rear wheel 13 is fitted. The pivot 35 is integral with one end of a bell crank lever 36 having its opposite end constrained, by means of a pin 37, to slide in a slot 38 provided in a rear extension 30 in the corresponding arm 32, parallelly to its extension, to form a link.

The rear bell crank levers 36 are substantially specular to the front bell crank levers 26.

Although FIGS. 1 to 4 show parts of the front steering, the application of the motorized wheel to the rear steering is obvious.

The transmission rod 19 has one end connected to the front connecting rod 23 and the other end connected to the rear connecting rod 33. As can be clearly seen in FIG. 6, the connections of the two ends of the transmission rod to the connecting rods are made rotatable and slidable to permit the rotation of the rod 19 with respect to the connecting rods 23, 33.

Thanks to the intermediate pivoting 20 of the transmission rod, upon rotation of the steering wheel the front connecting rod slides, causing the rear connecting rod to slide in the opposite direction. The rear bell cranks 36 thus rotate the rear wheels in the opposite direction to the front wheels, thereby achieving the function of four-wheel steering. In other words, the rack 15 and the transmission rod 19 form a steering control mechanism which makes it possible to control the synchronous movement of the two connecting rods and achieve the simultaneous steering of the two pairs of wheels.

As can be seen in FIG. 5, the kinematic steering mechanism is made and proportioned in such a way that the wheels on one side of the vehicle are arranged substantially tangent to the same circumference 40, 41. The two circumferences thus identified are concentric.

As can be seen in FIGS. 2 and 3, the end of each bearing rod is received in the housing 58 with side play which allows the steering of the wheel, while the end of the bell crank lever 26 (or 36), which is pivoted on the vertical section of the pivot 25 (or 35) is received in a slot 66 in the housing 58 so as to move integrally with the stationary portion of the wheel assembly and control the steering of the latter.

The wheel assembly is assembled, by simply fitting the stationary portion 45 and the wheel 13 onto the pivot, in sequence, the wheel having the drum and the rotating portion 46 fitted into the housing 43, and tightening the nut 53. The stationary portion is thus coupled onto the bell crank lever 26 (or 36) which makes the bell crank lever integral with the pivot 25 (or 35).

At this point it is clear that the intended scopes have been achieved by providing a sturdy and inexpensive wheel assembly containing the entire motorization of the wheel. It is thus easy to produce, for example, a four-wheel drive vehicle. It is also clear that, due exclusively to the particular structure of the driving wheels made in this way, it is possible to construct a kinematic steering mechanism for a toy four-wheel drive and four-wheel steering vehicle, which would otherwise be too complicated and expensive. Advantageously, the great majority of the elements of the wheel assembly can be moulded from plastic.

The foregoing description of an embodiment applying the innovative principles of this invention is obviously given by way of example in order to illustrate such innovative principles and should not therefore be understood as a limitation to the sphere of the invention claimed herein. For example, the proportions of the various elements can vary according to particular practical or aesthetical requirements.

Moreover, the vertical articulation of the pivot supporting the wheel can be made differently from the one shown, or be omitted completely whenever the wheel is not steering.

The term "cup", used to indicate the rotating portion 46, is understood to mean even a simple toothed ring fixed into the wheel. Alternatively, the cup can also be supported by the stationary unit and become secured to the wheel, for example, when the stationary unit is fitted onto the pivot.

The supporting rods can also be made from the chassis of the vehicle itself.

Lastly, the stop element which enables the various elements to be packed onto the pivot of the wheel can be made differently (for example, by radial protrusions on the pivot) from the bearing shown which is made by bending the pivot into an L-shape.

What is claimed is:

1. A vehicle comprising:

a chassis;

a plurality of wheels each having a rotation axis;

a separate pivot rotatably connected to each of said wheels;

a separate pivot support means for pivotally connecting each of said pivots to said chassis;

a separate cup fixed to said each wheel and rotatable with said respective wheel about said respective pivot;

a separate power unit mounted stationary on each said pivot and having a drive spindle for driving said respective cup in rotation coaxially about said respective pivot, each said drive spindle being spaced from said respective rotation axis;

a kinematic steering mechanism for steering the vehicle.

2. Vehicle as claimed in claim 1, wherein:

said kinematic steering mechanism comprises:

a front steering mechanism, which comprises a first articulated quadrilateral composed of a bearing rod, integral with the chassis of the vehicle, two articulating arms and a connecting rod, a pivot fitted with a front driving wheel being pivoted, according to a vertical axis, at each end of the bearing rod, in a more external position with respect to the articulating arms, the pivot being integral with one end of a bell crank lever, an opposite end of said bell crank lever being constrained to slide along the corresponding arm;

a rear steering mechanism, which comprises a second articulated quadrilateral composed of a bearing rod, integral with the chassis of the vehicle, two articulating arms and a connecting rod, a pivot fitted with a rear driving wheel being pivoted, according to a vertical axis, at each end of the bearing rod, in a more external position with respect to the articulating arms, the pivot being integral with one end of a bell crank lever, an opposite end of said bell crank lever being constrained to slide along the corresponding arm;

a steering control mechanism connected to the two connecting rods to control synchronous movement of the two connecting rods and achieve simultaneous steering of the two pairs of wheels.

3. Vehicle as claimed in claim 2, wherein:

said steering control mechanism comprises:

a rack connected to one of the connecting rods to control movement of said one connecting rod to the right and to the left and achieve steering of the pair of wheels connected to said one connecting rod;

a transmission rod connected between the connecting rods for corresponding movement of the other of the two connecting rods to the right and to the left upon movement of said one connecting rod and achieve steering of the pair of wheels connected to said other connecting rod in a direction complementary to that of the other pair of wheels.

4. Vehicle as claimed in claim 2, wherein;

said opposite end of each said bell crank lever is constrained to slide along the respective arm by means of a pin sliding in a slot provided in the arm and extending parallel to the length of the arm.

5. Vehicle as claimed in claim 2, wherein:

said bell crank levers of the front steering mechanism are substantially specular to the bell crank levers of the rear steering mechanism, the second bell crank levers being constrained to slide along their respective arms in correspondence with a portion of the arms which extends posteriorly to their pivoting with the rear bearing rod.

6. Vehicle as claimed in claim 3, wherein:

said transmission rod is pivoted to the chassis between the connecting rods.

7. Vehicle as claimed in claim 1, wherein:

in any steering conditions the wheels on the same side of the vehicle are substantially tangent to the same circumference and the two circumferences thus defined are substantially concentric.

8. A wheel assembly for a vehicle, the assembly comprising:

a wheel having a rotation axis;

a pivot rotatably connected to said wheel;

pivot support means for pivotally connecting said pivot to the vehicle;

a cup fixed to said wheel and rotatable about said pivot with said wheel;

a power unit mounted stationary on said pivot and having a drive spindle for driving said cup in rotation coaxially about said pivot, said drive spindle being spaced from said rotation axis.

9. An assembly in accordance with claim 8, wherein:

said wheel is driven through a periphery of said cup;

said wheel is rotatable on said pivot about said rotation axis.

10. An assembly in accordance with claim 8, wherein:

a drum element fixed to said wheel and substantially coaxial to said pivot;

said power unit includes a brake shoe radially movable with respect to said pivot to contact said drum element.

11. An assembly in accordance with claim 10, wherein:

said wheel includes an internal face forming a housing;

said cup and said drum element are arranged in said housing.

12. An assembly in accordance with claim 8, wherein:

said power unit includes a housing, and said housing of said power unit receives a portion of said pivot support means for blocking rotation of said power unit about said pivot.

13. An assembly in accordance with claim 8, wherein:

said pivot support means includes elements of a kinematic steering mechanism.

14. An assembly in accordance with claim 13, wherein:

said pivot is formed into an L-shape to obtain vertical pivoting ends in said kinematic steering mechanism.

15. A wheel assembly for a vehicle, the assembly comprising:

a wheel having a rotation axis;

a pivot rotatably connected to said wheel;

pivot support means for pivotally connecting said pivot to the vehicle;

a cup fixed to said wheel and rotatable about said pivot with said wheel;

a crown gear provided on an internal peripheral wall of said cup;

a power unit mounted stationary on said pivot and having a drive pinion engaging said crown gear, said power unit driving said wheel in rotation about said pivot through said drive pinion and said crown gear.

16. An assembly in accordance with claim 15, wherein:

said cup is fitted on said pivot separately from said power unit.

17. An assembly in accordance with claim 16, wherein:

said power unit, said cup and said wheel are packed together on said pivot;

said pivot includes a stop element on one end of said pivot and said pivot includes a tightening element on another end of said pivot for axially exerting pressure against said wheel.

* * * * *